United States Patent
Yoshioka et al.

(10) Patent No.: US 12,250,681 B2
(45) Date of Patent: Mar. 11, 2025

(54) TERMINAL AND COMMUNICATION METHOD

(71) Applicant: NTT DOCOMO, INC., Tokyo (JP)

(72) Inventors: Shohei Yoshioka, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 210 days.

(21) Appl. No.: 17/762,617

(22) PCT Filed: Oct. 9, 2019

(86) PCT No.: PCT/JP2019/039921
§ 371 (c)(1),
(2) Date: Mar. 22, 2022

(87) PCT Pub. No.: WO2021/070310
PCT Pub. Date: Apr. 15, 2021

(65) Prior Publication Data
US 2022/0346079 A1    Oct. 27, 2022

(51) Int. Cl.
*H04W 72/20*    (2023.01)
*H04L 5/00*    (2006.01)

(52) U.S. Cl.
CPC ........... *H04W 72/20* (2023.01); *H04L 5/0048* (2013.01)

(58) Field of Classification Search
CPC ..... H04W 72/20; H04W 72/25; H04W 72/27; H04W 72/29; H04W 8/20; H04W 36/0072; H04L 5/0048; H04L 5/005; H04L 5/0051
See application file for complete search history.

(56) References Cited

U.S. PATENT DOCUMENTS

| | | | | |
|---|---|---|---|---|
| 2020/0359375 A1* | 11/2020 | Hwang | | H04L 1/1854 |
| 2021/0105126 A1* | 4/2021 | Yi | | H04L 1/1671 |
| 2022/0022150 A1* | 1/2022 | Khoryaev | | H04W 56/002 |

OTHER PUBLICATIONS

International Search Report issued in PCT/JP2019/039921 on Apr. 21, 2020 (3 pages).
Written Opinion of the International Searching Authority issued in PCT/JP2019/039921 on Apr. 21, 2020 (3 pages).
NTT DOCOMO, Inc.; "Sidelink physical layer procedure for NR V2X"; 3GPP TSG RAN WG1 #98bis, R1-1911173; Chongqing, China; Oct. 14-20, 2019 (17 pages).
Intel Corporation; "Sidelink physical structure for NR V2X communication"; 3GPP TSG RAN WG1 Meeting #98bis, R1-1910648; Chongqing, China; Oct. 14-20, 2019 (29 pages).
3GPP TS 38.214 V15.6.0; "3rd Generation Partnership Project; Technical Specification Group Radio Access Network; NR; Physical layer procedures for data (Release 15)"; Jun. 2019 (105 pages).

(Continued)

*Primary Examiner* — Ian N Moore
*Assistant Examiner* — Brian T Le
(74) *Attorney, Agent, or Firm* — Osha Bergman Watanabe & Burton LLP

(57) ABSTRACT

A terminal includes a control unit that calculates a size of a transport block (TBS) to be transmitted on a Physical Sidelink Shared Channel (PSSCH) by applying a TBS determination method in a case where a Physical Sidelink Control Channel (PSCCH) and the PSSCH are to be frequency division multiplexed in a portion of a time resource of the PSSCH; and a transmitting unit that transmits the PSCCH and the PSSCH.

6 Claims, 10 Drawing Sheets

(56) References Cited

OTHER PUBLICATIONS

Office Action issued in Korean Patent Application No. 10-2022-7010778, dated Sep. 10, 2024 (12 pages).
3GPP TSG RAN WG1 #98; R1-1908900; LG Electronics; "Discussion on physical layer structure for NR sidelink"; Prague, CZ, Aug. 26-30, 2019 (34 pages).

* cited by examiner

FIG.4
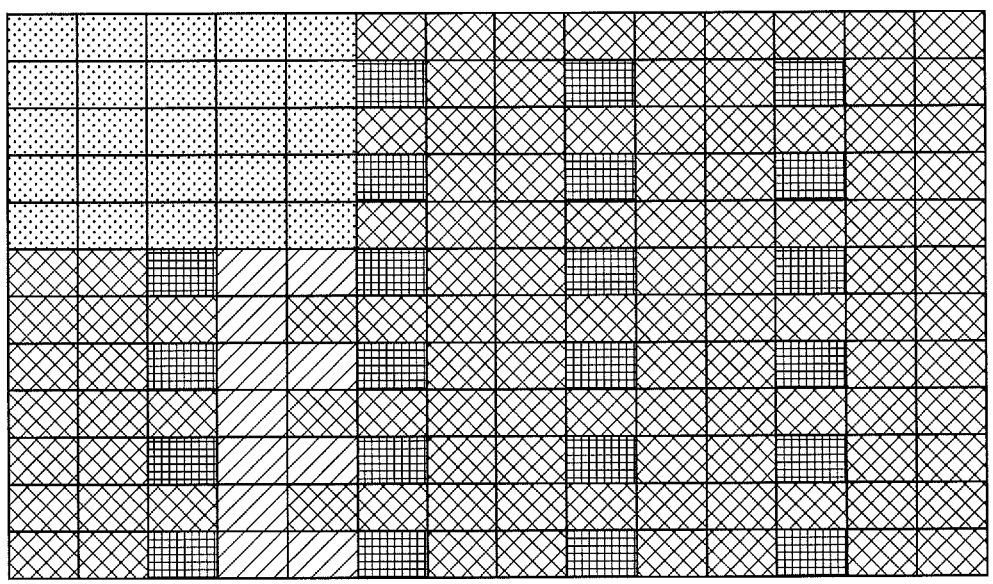
A-1
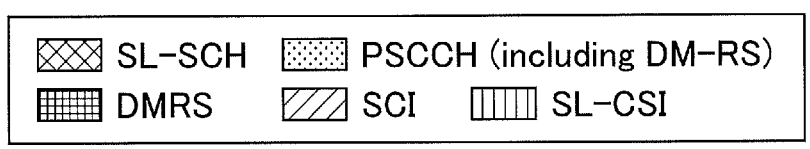

FIG.5
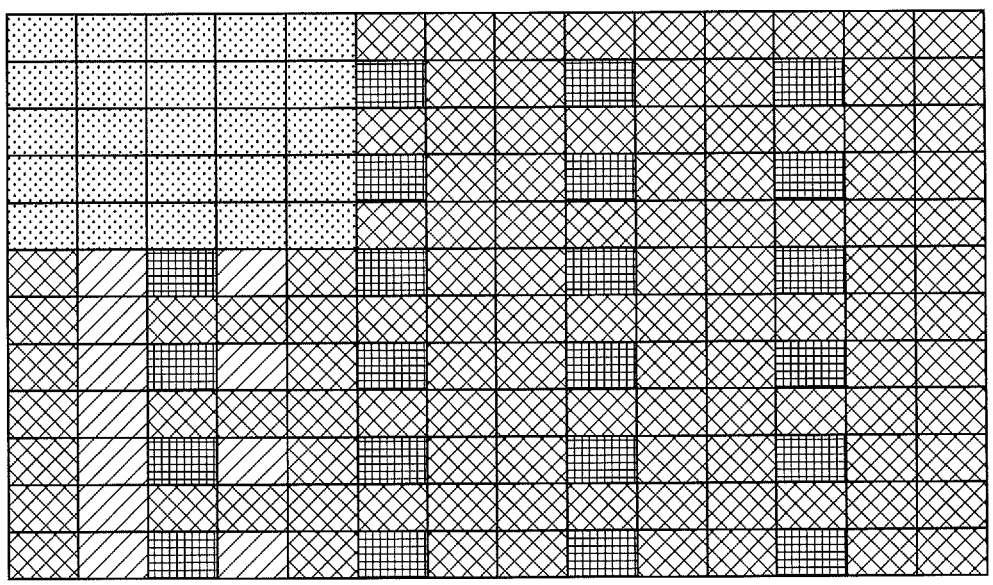
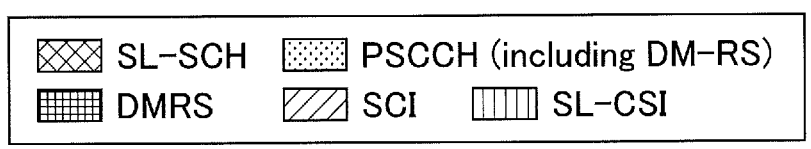

FIG.6
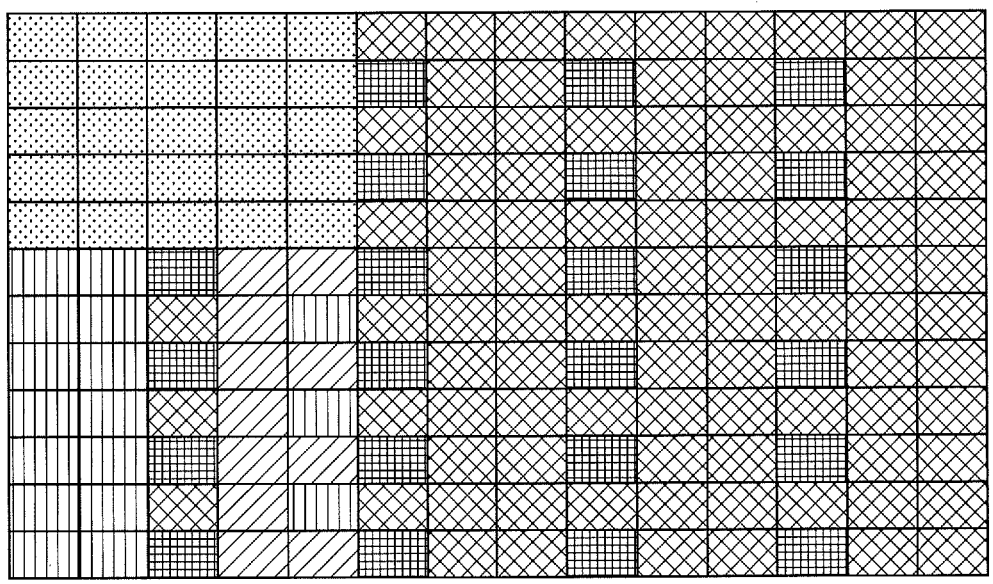
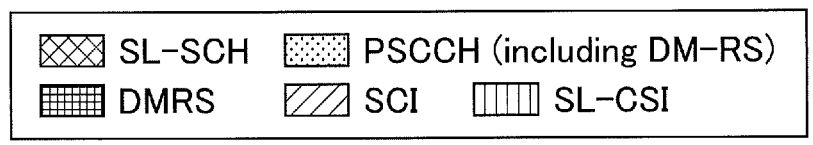

FIG.7
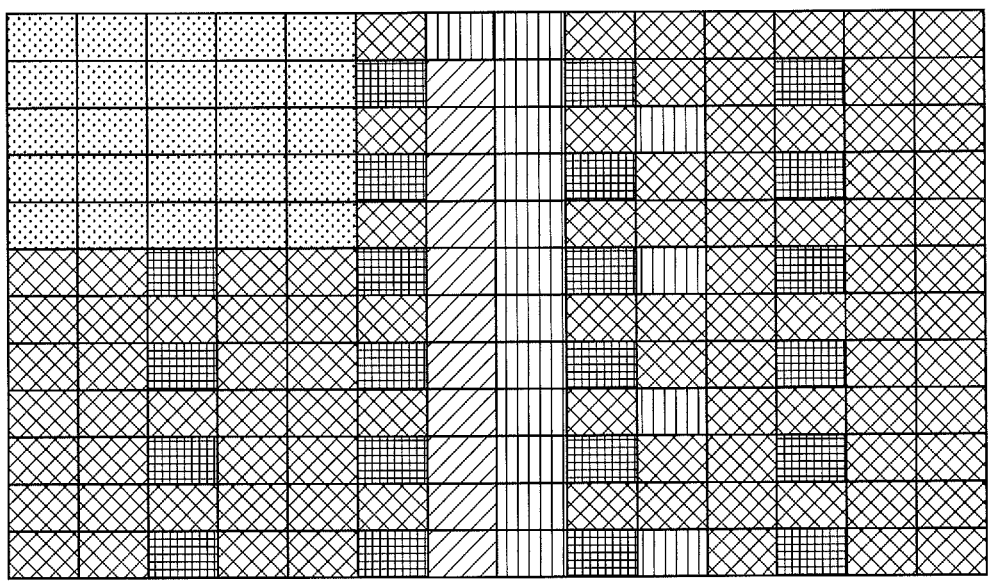
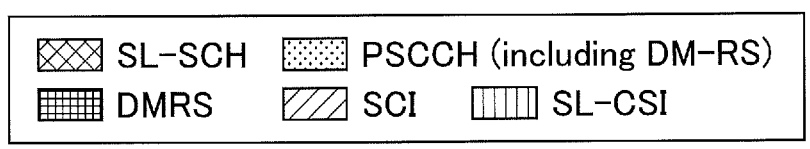

TERMINAL AND COMMUNICATION METHOD

TECHNICAL FIELD

The present invention relates to a terminal and a communication method in a radio communication system.

BACKGROUND ART

For Long Term Evolution (LTE) and a LTE successor system (e.g., LTE-Advanced (LTE-A), New Radio (NR) (which is also referred to as 5G)), sidelink (which is also referred to as Device to Device (D2D)) technology has been studied in which terminals, such as User Equipment (UE), directly communicate with each other without going through a base station.

In addition, implementation of V2X (Vehicle to Everything) has been studied and specifications have been developed. Here, V2X is a part of Intelligent Transport Systems (ITS) and, as illustrated in FIG. 1, V2X is a generic term for Vehicle to Vehicle (V2V), which implies a communication mode executed between vehicles; Vehicle to Infrastructure (V2I), which implies a communication mode executed between a vehicle and a rode-side unit (RSU: Road-Side Unit); Vehicle to Nomadic device (V2N), which implies a communication mode executed between a vehicle and a driver's mobile terminal; and a Vehicle to Pedestrian (V2P), which implies a communication mode executed between a vehicle and a pedestrian's mobile terminal.

PRIOR ART DOCUMENT

Non-Patent Document

Non-Patent Document 1: 3GPP TS 38.214 V15.6.0 (2019-06)

SUMMARY OF THE INVENTION

Problem to be Solved by the Invention

As a method of multiplexing a Physical Sidelink Control Channel (PSCCH) and a Physical Sidelink Shared Channel (PSSCH), Option 3 has been studied.

There is a need for a method for clarifying an operation of a terminal in a case where Option 3 is applied as the method of multiplexing the PSCCH and the PSSCH.

Means for Solving the Problem

According to an aspect of the present invention, there is provided a terminal including a control unit that calculates a size of a transport block (TBS) to be transmitted on a Physical Sidelink Shared Channel (PSSCH) by applying a TBS determination method in a case where a Physical Sidelink Control Channel (PSCCH) and the PSSCH are to be frequency division multiplexed in a portion of a time resource of the PSSCH; and a transmitting unit that transmits the PSCCH and the PSSCH.

Advantage of the Invention

According to an embodiment, there is provided a method for clarifying an operation of a terminal in a case where Option 3 is applied as a method of multiplexing a PSCCH and a PSSCH.

BRIEF DESCRIPTION OF DRAWINGS

FIG. 4 is a diagram illustrating an example of a mapping according to A-1.

FIG. 5 is a diagram illustrating an example of a mapping according to A-2.

FIG. 6 is a diagram illustrating an example of a mapping according to A-4.

FIG. 7 is a diagram illustrating an example of a mapping according to A-7.

EMBODIMENTS OF THE INVENTION

In the following, embodiments of the present invention (the embodiments) are described with reference to the drawings. The embodiments described below are merely examples, and the embodiments to which the present invention is applied are not limited to the following embodiments.

A method of direct communication between terminals according to the present embodiment is assumed to be LTE or NR sidelink (SL (Sidelink)), but the method of direct communication is not limited to this method. Additionally, the name "sidelink" is an example and UL (Uplink) may include a function of SL without using the name "sidelink." SL may be distinguished from DL (Downlink) or UL by a difference in frequency or time resource and SL may have another name.

UL and SL may also be distinguished by a difference in one or more combinations of time resources, frequency resources, time and frequency resources, reference signals referenced to determine a Pathloss in transmission power control, and reference signals used to synchronize (PSS/SSS/PSSS/SSSSS).

For example, for UL, a reference signal of an antenna port X_ANT is used as a reference signal to be referenced to determine a Pathloss in transmission power control, and for SL (including UL used as SL), a reference signal of antenna port Y_ANT is used as a reference signal to be referenced to determine a Pathloss in transmission power control.

In this embodiment, it is mainly assumed that a terminal (which may be referred to as user equipment (UE)) is installed in a vehicle, but embodiments of the present invention are not limited to this embodiment. For example, a terminal may be a terminal carried by a person, a terminal may be a device installed in a drone or an aircraft, or a terminal may be a base station, an RSU, a relay station (relay node), user equipment having a scheduling capability, etc.

Furthermore, PSSS (Primary Sidelink Synchronization signal) and SSSS (Secondary Sidelink Synchronization signal) may be used as synchronization signals for sidelink. For example, for an out-of-coverage operation, PSBCH (Physical Sidelink Broadcast Channel) may be used, which is for transmitting broadcast information, such as a sidelink system bandwidth, a frame number, resource configuration information. PSSS/SSSS and PSBCH are transmitted, for example, in a single subframe. PSSS/SSSS may be referred to as SLSS.

(System Configuration)

Figure 1:
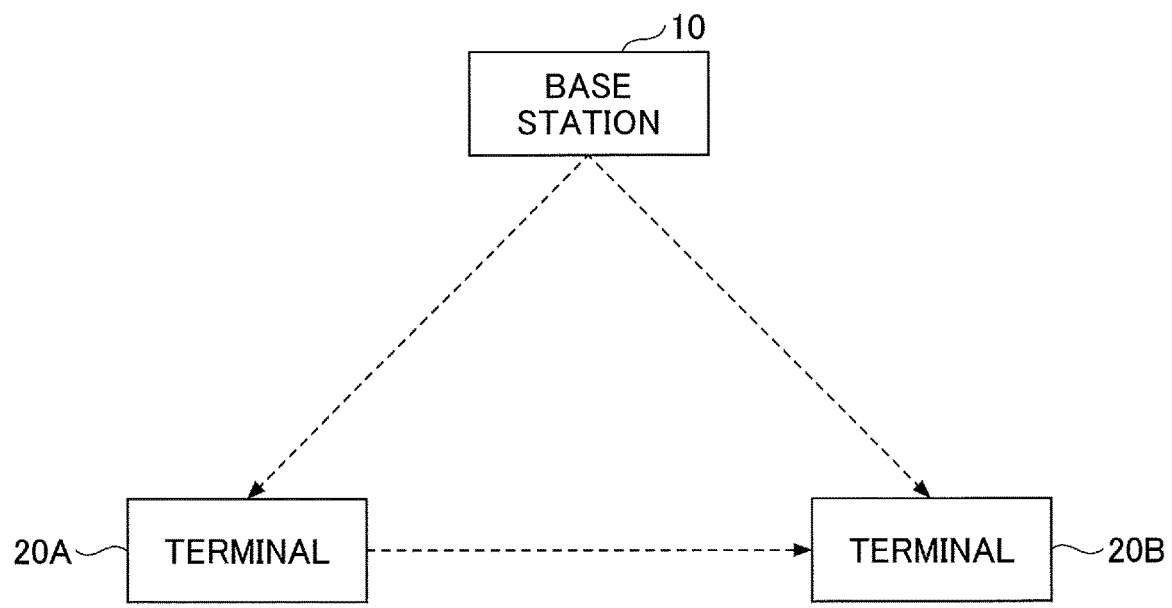
FIG. 1 is a diagram illustrating an example of a configuration of a radio communication system according to an embodiment.

FIG. 1 is a diagram illustrating an example of a configuration of a radio communication system according to an embodiment. As illustrated in FIG. 1, a radio communication system according to the embodiment includes a base station 10, a terminal 20A, and a terminal 20B. Note that, in practice, there may be a large number of terminals, but FIG. 1 illustrates the terminal 20A and the terminal 20B as an example.

In FIG. 61 the terminal 20A is intended to be the transmitting side and the terminal 20B is intended to be the receiving side. However, each of the terminal 20A and the terminal 20B is provided with both transmission function and reception function. In the following, when the terminals 20A, 20B, etc., are not particularly distinguished, it is simply described as the terminal 20 or the terminal. In FIG. 1, for example, a case is indicated in which both the terminal 20A and the terminal 20B are within the coverage. However, the operation according to this embodiment can be applied to a case in which all the terminals 20 are within the coverage; a case in which some of the terminals 20 are within the coverage and other terminals 20 are outside the coverage; and a case in which all the terminals 20 are outside the coverage.

In this embodiment, the terminal 20 is, for example, a device installed in a vehicle such as an automobile and has a function of cellular communication as user equipment (UE) in the LTE or NR and a side link function. Additionally, the terminal 20 includes functions, such as a GPS device, a camera, various types of sensors, for obtaining report information (location, event information, etc.). The terminal 20 may be a typical mobile terminal (such as a smartphone). The terminal 20 may be an RSU. The RSU may be a UE-type RSU with UE functions, a BS-type RSU with base station functions (also referred to as gNB-type UE), or a relay station.

The terminal 20 need not be a single housing device. For example, even if various types of sensors are distributed in a vehicle, the device including the various types of sensors is the terminal 20. The terminal 20 need not include various types of sensors, and the terminal 20 may include a function for transmitting data to and receiving data from the various types of sensors.

The details of processing of sidelink transmission by the terminal 20 are basically the same as the details of processing of UL transmission in the LTE or NR. For example, the terminal 20 scrambles a code word of transmission data, modulates to generate complex-valued symbols, and maps the complex-valued symbols to one or two layers for precoding. The precoded complex-valued symbols are then mapped to a resource element to generate a transmission signal (e.g., CP-OFDM, DFT-s-OFDM) and the transmission signal is transmitted from each antenna port.

The base station 10 has a function of cellular communication as the base station 10 in LTE or NR, and the base station 10 has a function for enabling communication of the terminal 20 according to the embodiments (e.g., resource pool configuration, resource assignment, etc.). The base station 10 may be an RSU (gNB-type RSU), a relay station, or a terminal having a scheduling function.

In the radio communication system according to the embodiments, a signal waveform used by the terminal 20 for SL or UL may be OFDMA, SC-FDMA, or other signal waveforms. In the radio communication system according to the embodiments, as an example, a frame including a plurality of subframes (e.g., 10 subframes) is formed in the time direction, and the frequency direction is formed of a plurality of subcarriers. One subframe is an example of one transmission Time Interval (TTI). However, TTIs are not necessarily subframes. For example, a TTI may be in units of slots or mini-slots or other time domain units. In addition, the number of slots per subframe may be determined in accordance with the subcarrier spacing. The number of symbols per slot may be 14. In addition, one symbol may include a Cyclic Prefix (CP) which is a guard period to reduce inter-symbol interference caused by multipath.

In a 3GPP meeting, a method of multiplexing a Physical Sidelink Control Channel (PSCCH) and a Physical Sidelink Shared Channel (PSSCH) has been studied. As a method of multiplexing a PSCCH and a PSSCH, for example, methods, such as Option 1A, Option 1B, Option 2, and Option 3, have been studied.

Figure 2:
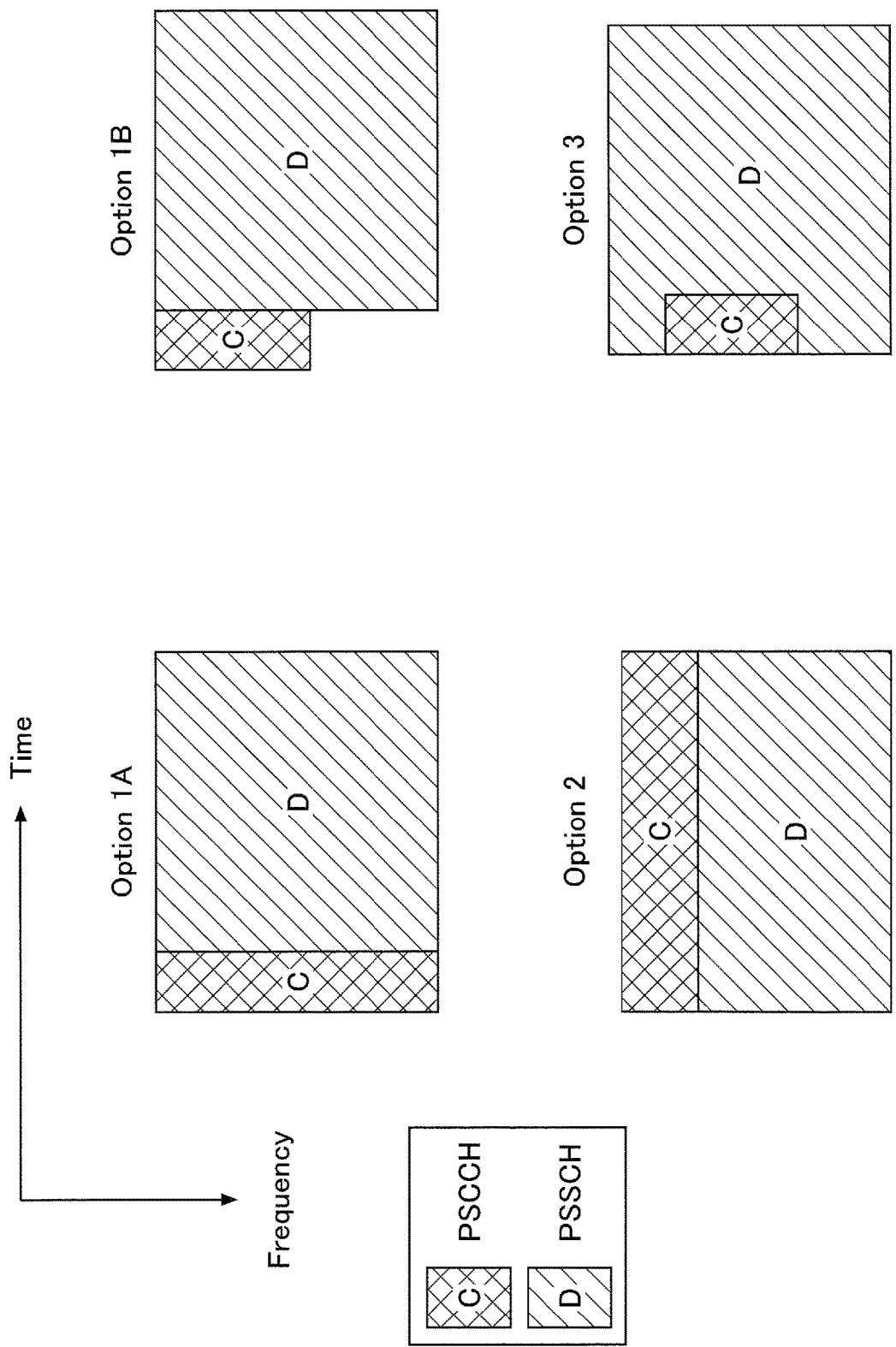
FIG. 2 is a diagram illustrating an example of a method of multiplexing a PSCCH and a PSSCH.

As illustrated in FIG. 2, in Option 3, PSCCH and a portion of the associated PSSCH are transmitted using time and frequency resources that overlap in a time domain while not overlapping in a frequency domain. The remaining portion of the PSSCH associated with the PSCCH is transmitted using a time domain resource that does not overlap with a PSCCH resource.

Furthermore, in a 3GPP meeting, Two-stage Sidelink Control Information (SCI) has been studied. The two-stage SCI is a method of transmitting SCI including a first-stage and a second-stage.

In a first-stage, the terminal 20 at a transmitting side transmits, for example, SCI including a simple information, such as sensing information and the location of a time frequency resource at which information on a second-stage is transmitted.

At the second-stage, the transmitting terminal 20 transmits more detailed information. For example, the terminal 20 that actually receives a PSSCH decodes SCI transmitted in the second-stage. The receiving terminal 20 that has performed decoding at the first-stage need not perform blind-decoding at the second-stage. The details of the two-stage SCI are currently unfixed.

Furthermore, in NR, reporting of Sidelink-Channel State Information (SL-CSI) is assumed to be supported. As for the SL-CSI, details, such as whether the SL-CSI is transmitted at a physical layer (PHY layer) or at a Medium Access Control (MAC) layer, are currently unfixed.

Furthermore, as for a method of determining a transport block size (TBS: Transport Block Size), a method according to NR Release 15 is assumed to be applied. However, details of a method of determining a TBS according NR Release 16 are currently unfixed.

In order to apply Option 3 as a method of multiplexing a PSCCH and a PSSCH, details of at least the following three items are to be determined.

(Item 1) A channel to be used for transmission at a second-stage of the Two-stage SCI.

(Item 2) A layer to be used for transmitting a SL-CSI report.

(Item 3) A method of determining a TBS corresponding to a case of a large overhead.

(Proposal)

For multiplexing SCI and/or a SL-CSI report and SL data according to Option 3, the terminal 20 may apply at least one of a specific multiplexing method or a specific TBS determination method.

(Proposal A)

The terminal 20 may transmit second-stage SCI and/or an SL-CSI report at a physical layer using a PSSCH. For example, the terminal 20 may transmit second-stage SCI and/or an SL-CSI report on a PSSCH using a method obtained by adding a specific modification to a method of "UCI multiplexing on PUSCH," which has been specified in NR Release 15.

(UCI multiplexing on PUSCH)

Figure 3:
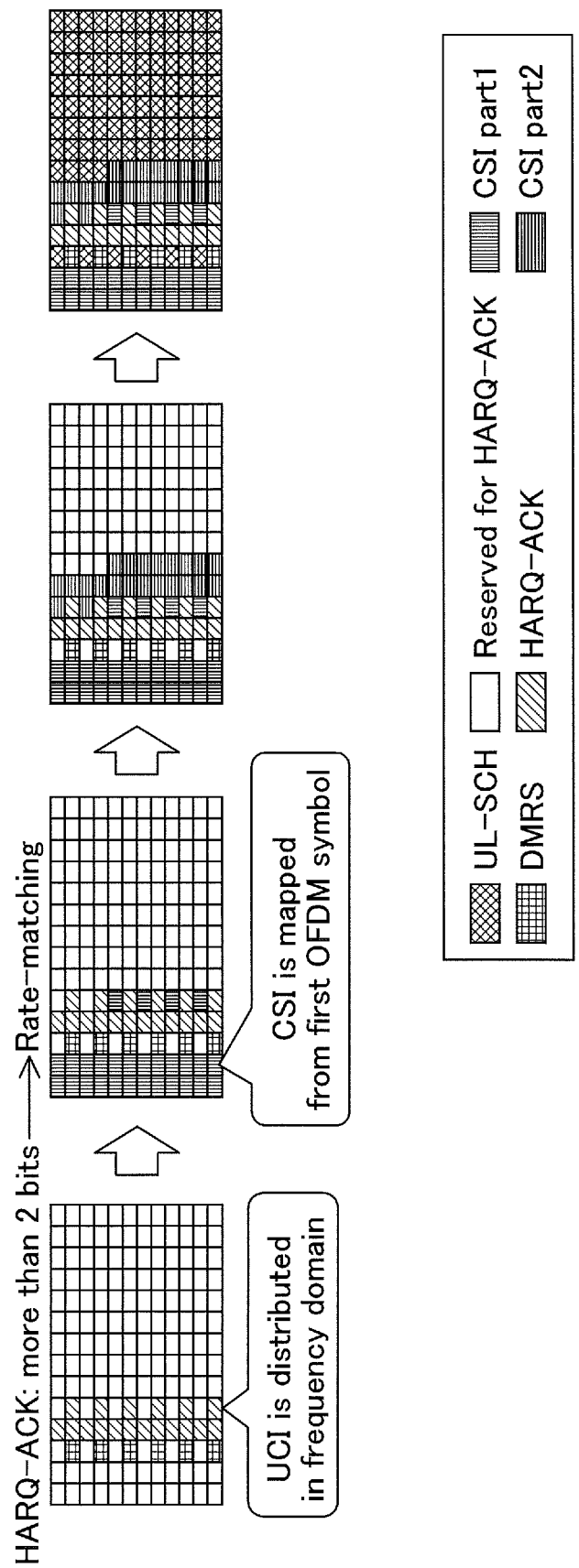
FIG. 3 is a diagram illustrating an example in which a HARQ-ACK and CSI are mapped onto a PUSCH.

Here, the method of "UCI multiplexing on PUSCH" specified in NR Release 15 is described by referring to FIG. 3. FIG. 3 is a diagram illustrating an example in which a HARQ-ACK (Hybrid Automatic Repeat Request-Acknowledgement) and CSI are mapped onto a PUSCH.

First, the HARQ-ACK is mapped from a symbol next to the first DMRS (Demodulation Reference Signal). In the example of FIG. 3, because the DMRS is mapped onto the third symbol from the front, the HARQ-ACK is to be mapped from the fourth symbol. Among the symbols onto which the HARQ-ACK is mapped, at a symbol at the end in the time direction, the HARQ-ACK is discretely mapped in the frequency direction. In the example of FIG. 3, at the fifth symbol, the HARQ-ACK are discretely mapped in the frequency direction. Note that in the embodiments of the present invention, DMRS may imply a DMRS for a PSSCH, or may imply a DMRS for decoding a PSSCH.

In the example of FIG. 3, the HARQ-ACK is mapped onto the symbol next to the first DMRS, so that the HARQ-ACK can be transmitted on the symbol with high channel estimation precision that is closer to the DMRS. Furthermore, by discretely mapping the HARQ-ACK in the frequency direction at the symbol at the end in the time direction among the symbols, onto which the HARQ-ACK is mapped, frequency diversity effect can be enhanced.

In the example of FIG. 3, after the mapping of the HARQ-ACK, mapping of a CSI part 1 is performed. The CSI part 1 is mapped from a front symbol in the time direction, regardless of the location of the DMRS. The CSI part 1 and the DMRS are not frequency-multiplexed. Furthermore, the CSI part 1 is mapped while avoiding a resource element onto which the HARQ-ACK is mapped. As a result, in the example of FIG. 3, the CSI part 1 is mapped onto the first symbol, the second symbol, and the fifth symbol in the time direction. Next, a CSI part 2 is mapped subsequent to the CSI part 1. In the example of FIG. 3, a UL-SCH, i.e., data is mapped onto the remaining resource elements.

In the following, a specific example is described that is an example of the "specific modification" to the method of "UCI multiplexing on PUSCH," which has been specified in NR Release 15.

(A-0)

The terminal 20 may map second-stage SCI and/or an SL-CSI report while avoiding a resource element (RE) of a PSCCH and/or an SL-CSI-Reference Signal (RS).

(A-1)

The terminal 20 may map second-stage SCI according to the HARQ-ACK in the above-described UCI multiplexing on PUSCH. FIG. 4 is a diagram illustrating an example of the mapping according to A-1. In the example of FIG. 4, the SCI is mapped from the symbol next to the first DMRS while avoiding a resource element of a PSCCH.

(A-2)

The terminal 20 may map second-stage SCI onto a symbol immediately in front of the first DMRS. Or, the terminal 20 may map second-stage SCI onto a symbol immediately in front of the first DMRS. For example, when a n-th symbol is a DMRS symbol, the terminal 20 may map second-stage SCI from n-1-th symbol. With such a configuration, second-stage SCI can be mapped onto a symbol with high channel estimation precision. FIG. 5 is a diagram illustrating an example of a mapping according to A-2. In the example of FIG. 5, the SCI is mapped from the symbol immediately in front of the first DMRS while avoiding a resource element of a PSCCH.

(A-3)

The terminal 20 may map an SL-CSI report according to the CSI part 1 in the above-described UCI multiplexing on PUSCH.

(A-4)

The terminal 20 may multiplex second-stage SCI and an SL-CSI report in one PSSCH. In this case, the terminal 20 may multiplex the second-stage SCI and the SL-CSI report in the one PSSCH together with sidelink data. Alternatively, when second-stage SCI and an SL-CSI report are multiplexed in one PSSCH, the terminal 20 may avoid multiplexing sidelink data in the PSSCH.

FIG. 6 is a diagram illustrating an example of a mapping according to A-4. In the example of FIG. 6, sidelink data, second-stage SCI, and an SL-CSI report are multiplexed in one PSSCH.

(A-5)

In a symbol onto which a DMRS is mapped, the terminal 20 may frequency division multiplex the DMRS and second-stage SCI and/or an SL-CSI report.

(A-6)

As a symbol onto which second-stage SCI is mapped, the terminal 20 may prioritize a symbol adjacent to a symbol onto which a DRMS is mapped over a symbol not adjacent to a symbol onto which a DMRS is not mapped.

(A-7)

The terminal 20 may map second-stage SCI and/or an SL-CSI report onto a symbol other than a symbol onto which a PSCCH is mapped. Namely, frequency division multiplexing of a PSCCH and second-stage SCI and/or an SL-CSI report in a same symbol may be avoided.

FIG. 7 is a diagram illustrating an example of a mapping according to A-7. In the example of FIG. 7, the second-stage SCI and the SL-CSI report are mapped onto a symbol other than a symbol onto which a PSCCH is mapped.

(A-8)

The terminal 20 may separately encode second-stage SCI and an SL-CSI report.

(A-9)

The terminal 20 may configure beta offset and/or scaling factor alpha, which are parameters for determining the number of coding bits for transmitting second-stage SCI and/or an SL-CSI report (i.e., the actual coding rate), independently from beta offset and/or scaling factor alpha for UCI (Uplink Control Information).

With the method according to the above-described proposal A, implementation of a terminal 20 for transmitting second-stage SCI and/or an SL-CSI report can be facilitated. With the methods according to A-1 and A-6, decoding performance of second-stage SCI can be enhanced. With the method according to A-2, the terminal 20 can obtain second-stage SCI faster. With the method according to A-5, decoding performance can be enhanced. With the method according to A-7, because a PSCCH and second-stage SCI and/or an SL-CSI report are time division multiplexed, mutual effect on performance can be reduced. For example, even if power-boosting is applied to a PSCCH, decoding performance of second-stage SCI and/or an SL-CSI report can be maintained.

(Proposal B)

The terminal 20 may determine a TBS by using a method obtained by adding a specific modification to the method of determining a TBS according to NR Release 15.

(B-1)

The following formula 1 is a formula for calculating an approximate number of REs that can be used in 1 PRB.

$$N'_{RE} = N_{SC}^{RB} \cdot N_{symb}^{sh} - N_{DMRS}^{PRB} - N_{oh}^{PRB}, \quad \text{[Formula 1]}$$

where $$N_{oh}^{PRB} \quad \text{[Formula 2]}$$

represents a number of REs of an overhead configured using xOverhead, which is a higher layer parameter. The xOverhead that is a higher layer parameter for determining a TBS may be configured separately from the xOverhead configured for NR-Uu communication.

(B-2)

When Option 3 is applied as the method of multiplexing a PSCCH and a PSSCH, a sidelink overhead is assumed to be greater than an NR-Uu overhead. Accordingly, a maximum value of the values that can be set for the xOverhead (pre) configured for sidelink communication may be greater than a maximum value of the values that can be set for the xOverhead configured for NR-Uu communication. For NR-Uu, the maximum value that can be set for the xOverhead, which is a higher layer parameter, is 18. In contrast, values that can be set for the sidelink xOverhead may be, for example, 0, 6, 12, 18, 24, 30, and 36.

(B-3)

The overhead of a PSCCH and/or second-stage SCI may be defined and used separately from the xOverhead. For example, the number of REs of a PSCCH and/or second-stage SCI in a scheduled subchannel is defined to be $N_{SCI}$. Furthermore, the number of scheduled PRBs is defined to be $n_{PRB}$. In this case, the formula for calculating the approximate number of REs that can be used in 1 PRB may be changed to the following Formula 3.

$$N'_{RE} = N_{SC}^{RB} \cdot N_{symb}^{sh} - N_{DMRS}^{PRB} - N_{oh}^{PRB} - N_{SCI}/n_{PRB} \quad \text{[Formula 3]}$$

(B-4)

The calculation of a TBS may be adjusted using a scaling factor. For example, the following Formula 4 may be applied.

$$N_{infor} = S \cdot N_{RE} \cdot R \cdot Q_m \cdot v \quad \text{[Formula 4]}$$

After calculating NRE using the above-described Formula 1 and Formula 2, the amount of information that can be transmitted can be calculated by multiplying a modulation level Qm, a layer number v, and a number of PRBs R. By multiplying a calculated amount of information by a scaling factor S, the amount of information that can be transmitted can be reduced. The scaling factor S may be (pre)configured by a higher layer parameter. Alternatively, the scaling factor S may be specified by SCI.

(B-5)

For calculating a number of DMRS resource elements per PRB, the terminal 20 may calculate the number of DMRS resource elements based on information related to a PSCCH resource.

(B-5-1)

For example, $$N_{DMRS}^{PRB}, \quad \text{[Formula 5]}$$

which represents the number of DMRS resource elements, may be the number of DMRS resource elements in a PRB not associated with a PSCCH.

(B-5-2)

For example, $$N_{DMRS}^{PRB}, \quad \text{[Formula 6]}$$

which represents the number of DMRS resource elements, may be the number of DMRS resource elements in a PRB associated with a PSCCH.

(B-5-3)

For example, $$N_{DMRS}^{PRB}, \quad \text{[Formula 7]}$$

which represents the number of DMRS resource elements, may be calculated from a ratio between the number of DMRS resource elements in a PRB not associated with a PSCCH and the number of DMRS resource elements in a PRB associated with a PSCCH. For example, in $$N'_{RE} = N_{SC}^{RB} \cdot N_{symb}^{sh} - N_{DMRS}^{PRB} - N_{oh}^{PRB} \quad \text{[Formula 8]}$$

$$N_{DMRS}^{PRB}, \quad \text{[Formula 9]}$$

which represents a number of DMRS resource elements, may be expressed as $$N_{DMRS}^{PRB} = (A \cdot n_a + B \cdot n_b)/(n_a + n_b) \quad \text{[Formula 10]}$$

Here, the A is the number of DMRS resource elements in a PRB associated with a PSCCH; B is the number of DMRS resource elements not associated with a PSCCH; $n_a$ is the number of PRBs associated with a PSCCH within a scheduled PRBs; and nb is the number of PRBs not associated with a PSCCH with in a scheduled PRBs.

Figure 8:
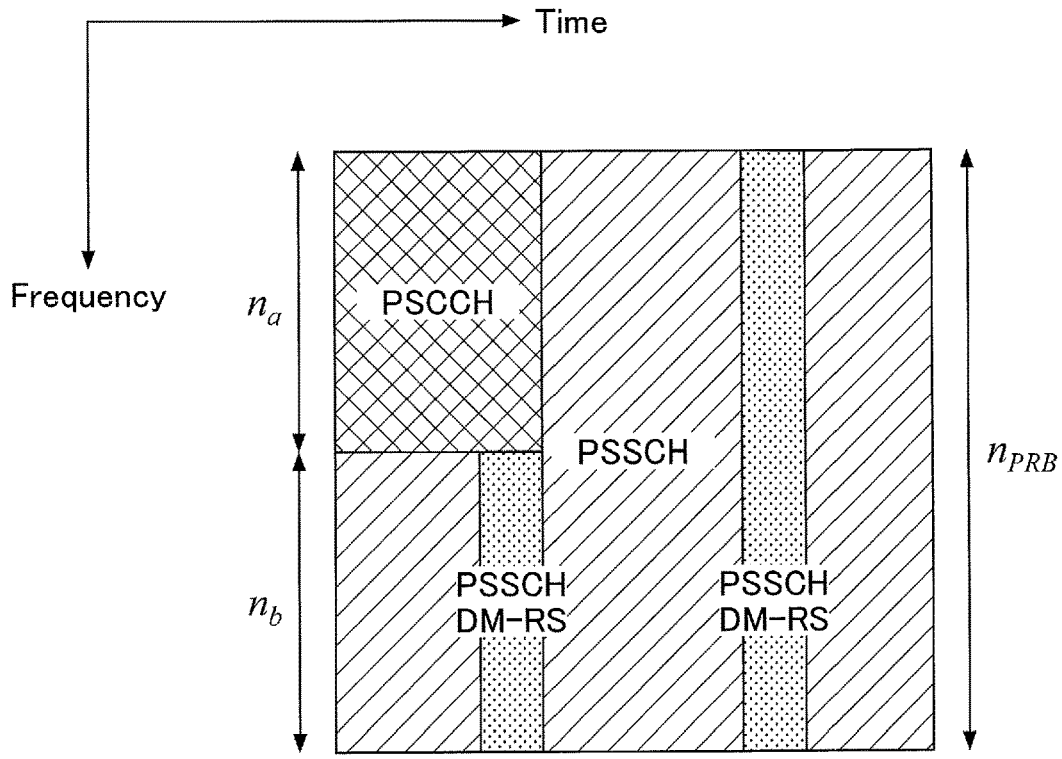
FIG. 8 is a diagram illustrating an example of a number of PRBs associated with PSCCHs and a number of PRBs not associated with PSCCHs, among scheduled PRBs.

FIG. 8 is a diagram illustrating an example of a number of PRBs associated with a PSCCH and a number of PRBs not associated with a PSCCH within a scheduled PRBs. For example, as illustrated in FIG. 8, if a number of scheduled PRBs is represented by $N_{PRB}$, a number of PRBs associated with a PSCCH within the scheduled PRBs may be na, and a number of PRBs not associated with a PSCCH within the scheduled PRBs may be $n_b$.

(B-5-4)

For example, the terminal 20 may apply a scaling factor to $$N_{DMRS}^{PRB}, \quad \text{[Formula 11]}$$

which represents a number of DMRS resource elements.

For example, the terminal 20 may apply a scaling factor to a formula for calculating an approximate number of REs that can be used in 1 PRB, as in the following Formula 12.

$$N'_{RE} = N_{SC}^{RB} \cdot N_{symb}^{sh} - S \cdot N_{DMRS}^{PRB} - N_{oh}^{PRB} \quad \text{[Formula 12]}$$

The scaling factor S may be (pre)configured by a higher layer parameter. Alternatively, the scaling factor S may be specified by SCI.

By using the method according to Proposal B, a transport block size can be determined while reflecting an overhead specific to sidelink.

(Device configuration)

Next, functional configuration examples of the base station 10 and the terminal 20 that perform the processing operations described above are described.

<Base Station 10>

Figure 9:
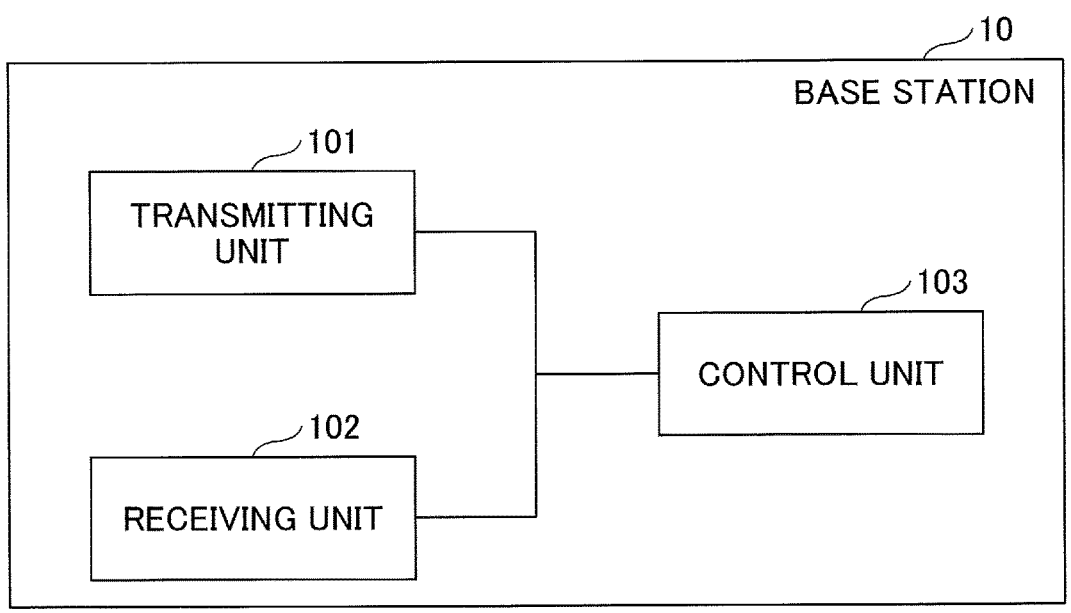
FIG. 9 is a diagram illustrating an example of a functional configuration of a base station according to an embodiment.

FIG. 9 is a diagram illustrating an example of a functional configuration of the base station 10. As illustrated in FIG. 9, the base station 10 includes a transmitting unit 101, a receiving unit 102, and a control unit 103. The functional configuration illustrated in FIG. 9 is merely one example. The functional division and names of functional units may be any division and names, provided that the operation according to the embodiments of the present invention can be performed. Note that the transmitting unit 101 may be referred to as a transmitter, and the receiving unit 102 may be referred to as a receiver.

The transmitting unit 101 includes a function for generating a signal to be transmitted to the terminal 20 and transmitting the signal through radio. The receiving unit 102 includes a function for receiving various types of signals transmitted from the terminal 20 and obtaining a higher layer signal from the received signal. Furthermore, the receiving unit 102 includes a function for measuring a received signal to obtain a quality value.

The control unit 103 controls the base station 10. Note that a function of the control unit 103 related to transmission may be included in the transmitting unit 101 and a function of the control unit 103 related to reception may be included in the receiving unit 102.

For example, the control unit 103 of the base station 10 may set a numerical value to a sidelink parameter xOverhead, and the transmitting unit 101 may transmit an RRC message including the sidelink parameter xOverhead to the terminal 20.

For example, the control unit 103 of the base station 10 may set a scaling coefficient S for a sidelink coding rate, and the transmitting unit 101 may transmit an RRC message including the set scaling coefficient S to the terminal 20.

<Terminal 20>

Figure 10:
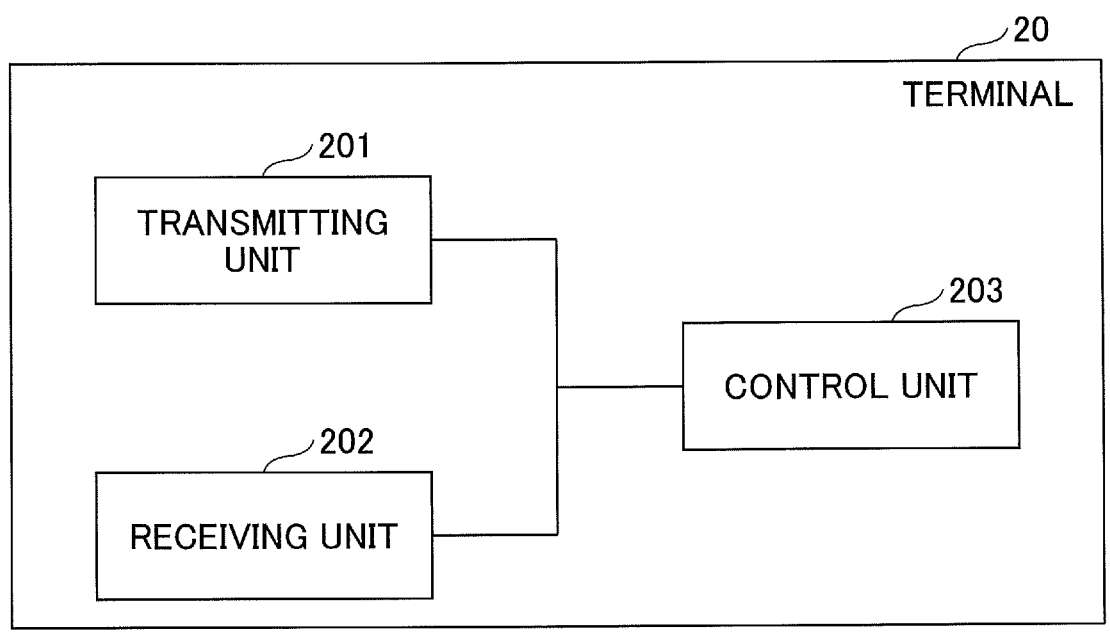
FIG. 10 is a diagram illustrating an example of a functional configuration of a terminal according to an embodiment.

FIG. 10 is a diagram illustrating an example of a functional configuration of the terminal 20. As illustrated in FIG. 10, the terminal 20 includes a transmitting unit 201, a receiving unit 202, and a control unit 203. The functional configuration illustrated in FIG. 10 is merely an example. The functional division and names of functional units may be any division and names, provided that the operation according to the embodiments can be performed. Note that the transmitting unit 201 may be referred to as a transmitting unit, and the receiving unit 202 may be referred to as a receiver. Furthermore, the terminal 20 may be the transmitting terminal 20A or the receiving terminal 20B. Furthermore, the terminal 20 may be the scheduling terminal 20.

The transmission unit 201 generates a transmitting signal from transmitting data and transmits the transmitting signal through radio. The receiving unit 202 receives various types of signals and obtains a higher layer signal from the received physical layer signal. The receiving unit 202 includes a function for measuring a received signal and obtaining a quality value.

The control unit 203 controls the terminal 20. Note that the function of the control unit 203 related to transmission may be included in the transmitting unit 201, and the function of the control unit 203 related to reception may be included in the receiving unit 202.

For example, when SCI and/or SL-CSI report and SL data are multiplexed according to Option 3, the control unit 203 of the terminal 20 may apply a specific multiplexing method and a specific TBS determination method.

For example, the control unit 203 of the terminal 20 may map second-stage SCI and/or an SL-CSI report onto a PSSCH resource. For example, when second-stage SCI and/or an SL-CSI report is to be mapped onto a PSSCH resource, the control unit 203 of the terminal 20 may use any method of the above-described A-0 to A-9.

For example, the control unit 203 of the terminal 20 may determine a TBS using xOverhead, which is a parameter for sidelink. Furthermore, for example, the control unit 203 of the terminal 20 may adjust a coding rage by applying a scaling coefficient S received by the receiving unit 202. For example, the control unit 203 of the terminal 20 may reflect whether a DMRS resource element is associated with a PSCCH for calculation of a number of DMRS resource elements per PRB. For example, the control unit 203 of the terminal 20 may apply a scaling coefficient to a numerical formula for calculating an approximate RE numbers available in 1 PRB <Hardware Configuration>

The block diagrams (FIG. 9 to FIG. 10) used for the description of the above embodiments show blocks of functional units. These functional blocks (components) are implemented by any combination of at least one of hardware and software. In addition, the implementation method of each functional block is not particularly limited. That is, each functional block may be implemented using a single device that is physically or logically combined, or may be implemented by directly or indirectly connecting two or more devices that are physically or logically separated (e.g., using wire, radio, etc.) and using these multiple devices. The functional block may be implemented by combining software with the above-described one device or the above-described plurality of devices. Functions include, but are not limited to, judgment, decision, determination, computation, calculation, processing, derivation, research, search, verification, reception, transmission, output, access, resolution, choice, selection, establishment, comparison, assumption, expectation, deeming, broadcasting, notifying, communicating, forwarding, configuring, reconfiguring, allocating, mapping, assigning, etc. For example, a functional block (component) that functions to transmit is called a transmitting unit or a transmitter. In either case, as described above, the implementation method is not particularly limited.

Figure 11:
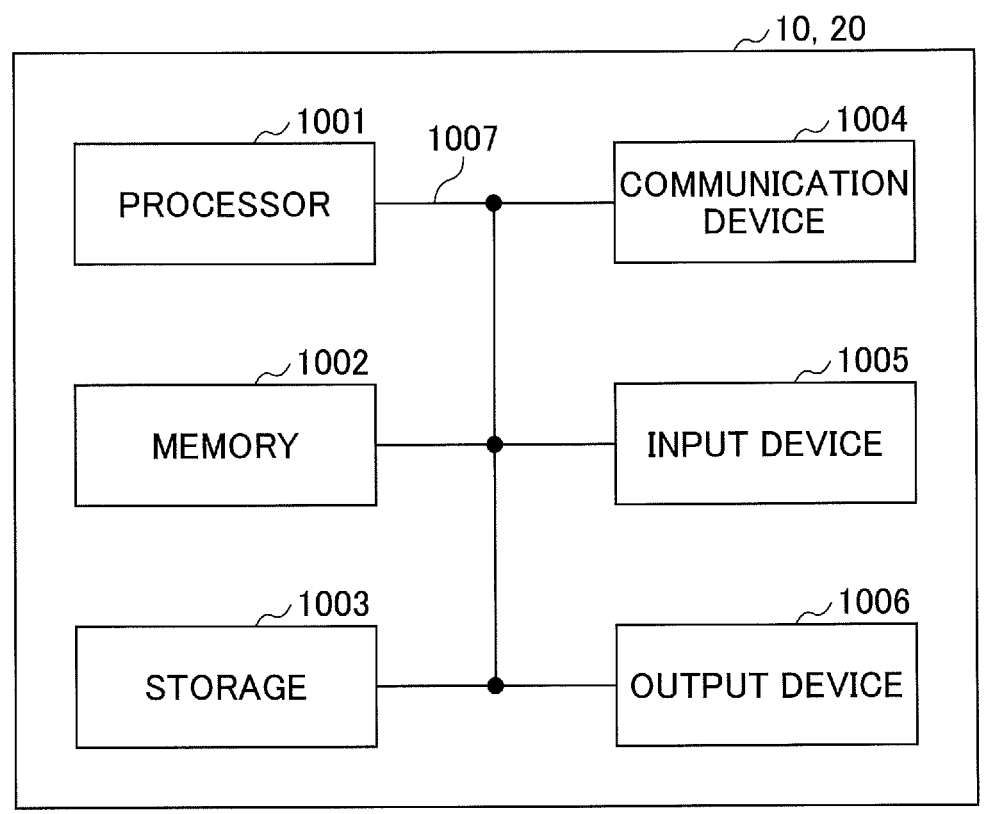
FIG. 11 is a diagram illustrating an example of a hardware configuration of a base station and a terminal according to an embodiment.

For example, the terminal 20 and the base station 10 according to an embodiment of the present invention may function as computers performing the process of the radio communication according to the embodiment of the present invention. FIG. 11 is a diagram illustrating an example of a hardware configuration of the terminal 20 and the base station 10 according to the embodiment. Each of the above-described terminal 20 and the base station 10 may be physically configured as a computer device including a processor 1001, a memory 1002, a storage 1003, a communication device 1004, an input device 1005, an output device 1006, a bus 1007, etc.

Note that, in the following description, the term "device" can be read as a circuit, a device, a unit, etc. The hardware configuration of the terminal 20 and the base station 10 may be configured to include one or more of the devices depicted in the figures, which are indicated by 1001 through 1006, or may be configured without some devices.

Each function of the terminal 20 and the base station 10 is implemented by loading predetermined software (program) on hardware, such as the processor 1001 and the memory 1002, so that the processor 1001 performs computation and controls communication by the communication device 1004, and at least one of reading and writing of data in the memory 1002 and the storage 1003.

The processor 1001, for example, operates an operating system to control the entire computer. The processor 1001 may be configured with a central processing unit (CPU: Central Processing Unit) including an interface with a peripheral device, a control device, a processing device, a register, etc.

Additionally, the processor 1001 reads a program (program code), a software module, data, etc., from at least one of the storage 1003 and the communication device 1004 to the memory 1002, and executes various processes according to these. As the program, a program is used which causes a computer to execute at least a part of the operations described in the above-described embodiment. For example, the control unit 203 of the terminal 20 may be implemented by a control program that is stored in the memory 1002 and that is operated by the processor 1001. While the various processes described above are described as being executed in one processor 1001, they may be executed simultaneously or sequentially by two or more processors 1001. The processor 1001 may be implemented by one or more chips. The program may be transmitted from a network via a telecommunications line.

The memory 1002 is a computer readable storage medium, and, for example, the memory 1002 may be formed of at least one of a ROM (Read Only Memory), an EPROM (Erasable Programmable ROM), an EEPROM (Electrically Erasable Programmable ROM), a RAM (Random Access Memory), etc. The memory 1002 may be referred to as a register, a cache, a main memory (main storage device), etc. The memory 1002 may store a program (program code), a software module, etc., which can be executed for implementing the radio communication method according to the embodiments of the present disclosure.

The storage 1003 is a computer readable storage medium and may be formed of, for example, at least one of an optical disk, such as a CD-ROM (Compact Disc ROM), a hard disk drive, a flexible disk, an optical magnetic disk (e.g., a compact disk, a digital versatile disk, a Blu-ray (registered trademark) disk), a smart card, a flash memory (e.g., a card, a stick, a key drive), a floppy (registered trademark) disk, a magnetic strip, etc. The storage 1003 may be referred to as an auxiliary storage device. The above-described storage medium may be, for example, a database including at least one of the memory 1002 and the storage 1003, a server, or any other suitable medium.

The communication device 1004 is hardware (transmitting and receiving device) for performing communication between computers through at least one of a wired network and a wireless network, and is also referred to, for example, as a network device, a network controller, a network card, a communication module, etc. The communication device 1004 may be configured to include, for example, a high frequency switch, a duplexer, a filter, a frequency synthesizer, etc., to implement at least one of frequency division duplex (FDD: Frequency Division Duplex) and time division duplex (TDD: Time Division Duplex).

The input device 1005 is an input device (e.g., a keyboard, mouse, microphone, switch, button, sensor, etc.) that receives an external input. The output device 1006 is an output device (e.g., a display, speaker, LED lamp, etc.) that implements an external output. The input device 1005 and the output device 1006 may have an integrated configuration (for example, a touch panel).

Each device, such as the processor 1001 and the memory 1002, is also connected by the bus 1007 for communicating information. The bus 1007 may be formed of a single bus or may be formed of different buses between devices.

The terminal 20 and the base station 10 may each include hardware, such as a microprocessor, a digital signal processor (DSP: Digital Signal Processor), an ASIC (Application Specific Integrated Circuit), a PLD (Programmable Logic Device), and a FPGA (Field Programmable Gate Array), which may implement some or all of each functional block. For example, processor 1001 may be implemented using at least one of these hardware components.

(Conclusion of the embodiments)

In this specification, at least the following terminal and communication method are disclosed.

A terminal including a control unit that calculates a size of a transport block (TBS) to be transmitted on a Physical Sidelink Shared Channel (PSSCH) by applying a TBS determination method in a case where a Physical Sidelink Control Channel (PSCCH) and the PSSCH are to be frequency division multiplexed in a portion of a time resource of the PSSCH; and a transmitting unit that transmits the PSCCH and the PSSCH.

According to the above-described configuration, an operation of a terminal can be clarified in a case where Option 3 is applied as a method of multiplexing a PSCCH and a PSSCH.

The specific TBS determination method may include calculating a number of resource elements of a Demodulation Reference Signal (DMRS) per physical resource block (PRB), based on information of a resource of the PSCCH.

According to the above-described configuration, for calculating the number of the resource elements per the PRB, the terminal can calculate the number of the resource elements of the DMRS per the PRB taking into account whether the PRB includes the PSCCH or the PRB does not include the PSCCH.

The TBS determination method may calculate the number of resource elements of the DRMS per the PRB from a ratio between a number of resources of the DMRS in a PRB without the PSCCH and a number of resources of the DMRS in a PRB with the PSCCH.

According to the above-described configuration, for calculating the number of the resource elements per the PRB, the terminal can calculate the number of the resource elements of the DMRS per the PRB taking into account whether the PRB includes the PSCCH or the PRB does not include the PSCCH.

The TBS determination method may include multiplying the calculated number of resource elements of the DMRS per the PRB by a scaling factor.

According to the above-described configuration, the transport block size can be determined while taking into account the overhead specific to the sidelink.

A communication method executed by a terminal, the method including calculating a size of a transport block (TBS) to be transmitted on a Physical Sidelink Shared Channel (PSSCH) by applying a TBS determination method in a case where a Physical Sidelink Control Channel (PSCCH) and the PSSCH are to be frequency division multiplexed in a portion of a time resource of the PSSCH; and transmitting the PSCCH and the PSSCH.

According to the above-described configuration, an operation of a terminal can be clarified in a case where Option 3 is applied as a method of multiplexing a PSCCH and a PSSCH.

(Supplemental Embodiments)

While the embodiments of the present invention are described above, the disclosed invention is not limited to the embodiments, and those skilled in the art will appreciate various alterations, modifications, alternatives, substitutions, etc. Descriptions are provided using specific numerical examples to facilitate understanding of the invention, but, unless as otherwise specified, these values are merely examples and any suitable value may be used. Classification of the items in the above descriptions is not essential to the present invention, and the items described in two or more items may be used in combination as needed, or the items described in one item may be applied (unless inconsistent) to the items described in another item. The boundaries of functional units or processing units in the functional block diagram do not necessarily correspond to the boundaries of physical components. An operation by a plurality of functional units may be physically performed by one component or an operation by one functional unit may be physically executed by a plurality of components. For the processing procedures described in the embodiment, the order of processing may be changed as long as there is no inconsistency. For the convenience of the description of the process, the terminal 20 and the base station 10 are described using functional block diagrams, but such devices may be implemented in hardware, software, or a combination thereof. Software operated by a processor included in the terminal 20 in accordance with embodiments of the present invention and software operated by a processor included in the base station 10 in accordance with embodiments of the present invention may be stored in a random access memory (RAM), a flash memory (RAM), a read-only memory (ROM), an EPROM, an EEPROM, a register, a hard disk (HDD), a removable disk, a CD-ROM, a database, a server, or any other suitable storage medium, respectively.

Notification of information is not limited to the aspects/embodiments described in the disclosure, and notification of information may be made by another method. For example, notification of information may be implemented by physical layer signaling (e.g., DCI (Downlink Control Information), UCI (Uplink Control Information), higher layer signaling (e.g., RRC (Radio Resource Control) signaling, MAC (Medium Access Control) signaling, broadcast information (MIB (Master Information Block), SIB (System Information Block))), or other signals or combinations thereof. RRC signaling may be referred to as an RRC message, for example, which may be an RRC connection setup message, an RRC connection reconfiguration message, etc.

The aspects/embodiments described in this disclosure may be applied to a system using at least one of LTE (Long Term Evolution), LTE-A (LTE-Advanced), SUPER 3G, IMT-Advanced, 4G (4th generation mobile communication system), 5G (5th generation mobile communication system), FRA (Future Radio Access), W-CDMA (Registered Trademark), GSM (Registered Trademark), CDMA2000, UMB (Ultra Mobile Broadband), IEEE 802.11 (Wi-Fi (Registered Trademark)), IEEE 802.16 (WiMAX (Registered Trademark)), IEEE 802.20, UWB (Ultra-WideBand), Bluetooth (Registered Trademark), any other appropriate system, and a next generation system extended based on theses. Additionally, a plurality of systems may be combined (e.g., a combination of at least one of LTE and LTE-A and 5G) to be applied.

The processing procedures, sequences, flow charts, etc., of each aspect/embodiment described in this disclosure may be reordered, provided that there is no contradiction. For example, the methods described in this disclosure present elements of various steps in an exemplary order and are not limited to the particular order presented.

The particular operation described in this disclosure to be performed by the base station 10 may be performed by an upper node in some cases. It is apparent that in a network consisting of one or more network nodes having the base station 10, various operations performed for communicating with the terminal may be performed by at least one of the base station 10 and a network node other than the base station 10 (e.g., MME or S-GW can be considered, however, the network node is not limited to these). The case is exemplified above in which there is one network node other than the base station 10. However, the network node other than the base station 10 may be a combination of multiple other network nodes (e.g., MME and S-GW).

Input and output information, etc., may be stored in a specific location (e.g., memory) or managed using management tables. Input and output information, etc., may be overwritten, updated, or added. Output information, etc., may be deleted. The input information, etc., may be transmitted to another device.

The determination may be made by a value (0 or 1) represented by 1 bit, by a true or false value (Boolean: true or false), or by comparison of numerical values (e.g., a comparison with a predefined value).

The aspects/embodiments described in this disclosure may be used alone, in combination, or switched with implementation. Notification of predetermined information (e.g. "X" notice) is not limited to a method that is explicitly performed, and may also be made implicitly (e.g. "no notice of the predetermined information").

Software should be broadly interpreted to mean, regardless of whether referred to as software, firmware, middleware, microcode, hardware description language, or any other name, instructions, sets of instructions, code, code segments, program code, programs, subprograms, software modules, applications, software applications, software packages, routines, subroutines, objects, executable files, executable threads, procedures, functions, etc.

Software, instructions, information, etc., may also be transmitted and received via a transmission medium. For example, when software is transmitted from a website, server, or other remote source using at least one of wireline technology (such as coaxial cable, fiber optic cable, twisted pair, digital subscriber line) and wireless technology (infrared, microwave, etc.), at least one of these wireline technology and wireless technology is included within the definition of a transmission medium.

The information, signals, etc., described in this disclosure may be represented using any of a variety of different techniques. For example, data, instructions, commands, information, signals, bits, symbols, chips, etc., which may be referred to throughout the above description may be represented by voltages, currents, electromagnetic waves, magnetic fields or magnetic particles, optical fields or photons, or any combination thereof.

The terms described in this disclosure and those necessary for understanding this disclosure may be replaced by terms having the same or similar meanings. For example, at least one of the channels and the symbols may be a signal (signaling). The signal may also be a message.

As used in this disclosure, the terms "system" and "network" are used interchangeably. The information, parameters, etc., described in the present disclosure may also be expressed using absolute values, relative values from predetermined values, or they may be expressed using corresponding separate information. For example, radio resources may be those indicated by an index.

The name used for the parameters described above are not restrictive in any respect. In addition, the mathematical equations using these parameters may differ from those explicitly disclosed in this disclosure. Since the various channels (e.g., PUCCH, PDCCH, etc.) and information elements can be identified by any suitable name, the various names assigned to these various channels and information elements are not in any way limiting.

In this disclosure, the terms "Base Station," "Radio Base Station," "Fixed Station," "NodeB," "eNodeB(eNB)," "gNodeB (gNB)," "Access Point," "Transmission Point," "Reception Point," "Transmission/Reception Point," "Cell," "Sector," "Cell Group," "Carrier," "Component Carrier," etc., may be used interchangeably. The base stations may be referred to in terms such as macro-cell, small-cell, femto-cell, pico-cell, etc.

The base station can accommodate one or more (e.g., three) cells. Where the base station accommodates a plurality of cells, the entire coverage area of the base station can be divided into a plurality of smaller areas, each smaller area can also provide communication services by means of a base station subsystem (e.g., an indoor small base station (RRH) or a remote Radio Head). The term "cell" or "sector" refers to a portion or all of the coverage area of at least one of the base station and base station subsystem that provides communication services at the coverage.

In this disclosure, terms such as "mobile station (MS: Mobile Station)", "user terminal", "user equipment (UE: User Equipment)", "terminal", etc., may be used interchangeably.

The mobile station may be referred to by one of ordinary skill in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable term.

At least one of a base station and a mobile station may be referred to as a transmitter, a receiver, a terminal, etc. At least one of a base station and a mobile station may be a device installed in a mobile body, a mobile body itself, etc. The mobile body may be a vehicle (e.g., a car, an airplane, etc.), an unmanned mobile (e.g., a drone, an automated vehicle, etc.), or a robot (manned or unmanned). At least one of a base station and a mobile station includes a device that does not necessarily move during communication operations. For example, at least one of a base station and a mobile station may be an IoT (Internet of Things) device such as a sensor.

In addition, the base station in the present disclosure may be replaced with the terminal. For example, various aspects/embodiments of the present disclosure may be applied to a configuration in which communication between the base stations and the user terminal is replaced with communication between multiple user terminals (e.g., may be referred to as D2D (Device-to-Device), V2X (Vehicle-to-Everything), etc.). In this case, a configuration may be such that the above-described function of the base station 10 is included in the user terminal 20. The terms "up" and "down" may also be replaced with the terms corresponding to terminal-to-terminal communication (e.g., "side"). For example, an uplink channel, a downlink channel, etc., may be replaced with a sidelink channel.

Similarly, the user terminal according to the present disclosure may be replaced with a base station. In this case, a configuration may be such that, the function included in the above-described user terminal 20 may be included in the base station 10.

The term "connected" or "coupled" or any variation thereof means any direct or indirect connection or connection between two or more elements and may include the presence of one or more intermediate elements between two elements "connected" or "coupled" with each other. The coupling or connection between the elements may be physical, logical, or a combination of these. For example, "connection" may be replaced with "access". As used in the present disclosure, the two elements may be considered as being "connected" or "coupled" to each other using at least one of the one or more wires, cables, and printed electrical connections and, as a number of non-limiting and non-inclusive examples, electromagnetic energy having wavelengths in the radio frequency region, the microwave region, and the light (both visible and invisible) region.

The reference signal may be abbreviated as RS (Reference Signal) or may be referred to as a pilot, depending on the standards applied.

As used in this disclosure, the expression "based on" does not mean "based on only" unless otherwise specified. In other words, the expression "based on" means both "based on only" and "at least based on."

As long as "include," "including," and variations thereof are used in this disclosure, the terms are intended to be inclusive in a manner similar to the term "comprising." Furthermore, the term "or" used in the disclosure is intended not to be an exclusive OR.

A radio frame may be formed of one or more frames in the time domain. In the time domain, each of the one or more frames may be referred to as a subframe. A subframe may further be formed of one or more slots in the time domain. A subframe may be a fixed time length (e.g., 1 ms) that does not depend on numerology.

The numerology may be a communication parameter to be applied to at least one of transmission or reception of a signal or a channel. The numerology may represent, for example, at least one of a subcarrier spacing (SCS: SubCarrier Spacing), a bandwidth, a symbol length, a cyclic prefix length, a transmission time interval (TTI: Transmission Time Interval), a symbol number per TTI, a radio frame configuration, a specific filtering process performed by a transceiver in a frequency domain, a specific windowing process performed by a transceiver in a time domain, etc.

A slot may be formed of, in a time domain, one or more symbols (OFDM (Orthogonal Frequency Division Multiplexing) symbols, SC-FDMA (Single Carrier Frequency Division Multiple Access) symbols, etc.). A slot may be a unit of time based on the numerology.

A slot may include a plurality of mini-slots. In a time domain, each mini-slot may be formed of one or more symbols. A mini-slot may also be referred to as a sub-slot. A mini-slot may be formed of fewer symbols than those of a slot. The PDSCH (or PUSCH) transmitted in a unit of time that is greater than a mini-slot may be referred to as PDSCH (or PUSCH) mapping type A. The PDSCH (or PUSCH) transmitted using a mini-slot may be referred to as PDSCH (or PUSCH) mapping type B.

Each of the radio frame, subframe, slot, mini-slot, and symbol represents a time unit for transmitting a signal. The radio frame, subframe, slot, mini-slot, and symbol may be called by respective different names.

For example, one subframe may be referred to as a transmission time interval (TTI: Transmission Time Interval), a plurality of consecutive subframes may be referred to as TTI, or one slot or one mini-slot may be referred to as TTI. Namely, at least one of a subframe and TTI may be a subframe (1 ms) in the existing LTE, may be a time interval shorter than 1 ms (e.g., 1 to 13 symbols), or a time interval longer than 1 ms. Note that the unit representing the TTI may be referred to as a slot, a mini-slot, etc., instead of a subframe.

Here, the TTI refers to, for example, the minimum time unit of scheduling in radio communication. For example, in the LTE system, the base station performs scheduling for allocating radio resources (such as a frequency bandwidth, transmission power, etc., that can be used in each terminal 20) in units of TTIs to each terminal 20. Note that the definition of the TTI is not limited to this.

The TTI may be a transmission time unit, such as a channel coded data packet (transport block), a code block, a codeword, etc., or may be a processing unit for scheduling, link adaptation, etc. Note that, when a TTI is provided, a time interval (e.g., a symbol number) onto which a transport block, a code block, or a code ward is actually mapped may be shorter than the TTI.

Note that, when one slot or one mini-slot is referred to as a TTI, one or more TTIs (i.e., one or more slots or one or more mini-slots) may be the minimum time unit of scheduling. Additionally, the number of slots (the number of mini-slots) forming the minimum time unit of scheduling may be controlled.

A TTI with a time length of 1 ms may be referred to as an ordinary TTI (TTI in LTE Rel. 8-12), a normal TTI, a long TTI, an ordinary subframe, a normal subframe, a long subframe, a slot, etc. A TTI that is shorter than a normal TTI may be referred to as a shortened TTI, a short TTI, a partial TTI (partial TTI or fractional TTI), a shortened subframe, a short subframe, a mini-slot, a sub-slot, a slot, etc.

Note that a long TTI (e.g., a normal TTI, a subframe, etc.) may be replaced with a TTI with a time length exceeding 1 ms, and a short TTI (e.g., a shortened TTI, etc.) may be replaced with a TTI with a TTI length that is shorter than the TTI length of the long TTI and longer than or equal to 1 ms.

A resource block (RB) is a resource allocation unit in the time domain and the frequency domain, and may include one or more consecutive subcarriers in the frequency domain. A number of subcarriers included in a RB may be the same irrespective of numerology, and may be 12, for example. The number of subcarriers included in a RB may be determined based on numerology.

Additionally, the resource block may include one or more symbols in the time domain, and may have a length of one slot, one mini-slot, one subframe, or one TTI. Each of one TTI and one subframe may be formed of one or more resource blocks.

Note that one or more RBs may be referred to as a physical resource block (PRB: Physical RB), a subcarrier group (SCG: Sub-Carrier Group), a resource element group (REG: Resource Element Group), a PRB pair, a RB pair, etc.

Additionally, a resource block may be formed of one or more resource elements (RE: Resource Element). For example, 1 RE may be a radio resource area of 1 subcarrier and 1 symbol.

A bandwidth part (BWP: Bandwidth Part) (which may also be referred to as a partial bandwidth, etc.) may represent, in a certain carrier, a subset of consecutive common RB (common resource blocks) for a certain numerology. Here, the common RB may be specified by an index of a RB when a common reference point of the carrier is used as a reference. A PRB may be defined in a BWP, and may be numbered in the BWP.

The BWP may include a BWP for UL (UL BWP) and a BWP for DL (DL BWP). For a UE, one or more BWPs may be configured within one carrier.

At least one of the configured BWPs may be active, and the UE is may not assume that a predetermined signal/channel is communicated outside the active BWP. Note that "cell," "carrier," etc. in the present disclosure may be replaced with "BWP."

The structures of the above-described radio frame, subframe, slot, mini-slot, symbol, etc., are merely illustrative. For example, the following configurations can be variously changed: the number of subframes included in the radio frame; the number of slots per subframe or radio frame; the number of mini-slots included in the slot; the number of symbols and RBs included in the slot or mini-slot; the number of subcarriers included in the RB; and the number of symbols, the symbol length, the cyclic prefix (CP: Cyclic Prefix) length, etc., within the TTI.

In the present disclosure, for example, if an article is added by translation, such as a, an, and the in English, the present disclosure may include that the noun following the article is plural.

In the present disclosure, the term "A and B are different" may imply that "A and B are different from each other." Note that the term may also imply "each of A and B is different from C." The terms, such as "separated," "coupled," etc., may also be interpreted similarly.

While the present disclosure is described in detail above, those skilled in the art will appreciate that the present disclosure is not limited to the embodiments described in the present disclosure. The disclosure may be implemented as modifications and variations without departing from the gist and scope of the disclosure as defined by the claims. Accordingly, the description of the present disclosure is for illustrative purposes only and is not intended to have any restrictive meaning with respect to the present disclosure.

LIST OF REFERENCE SYMBOLS

10 base station
20 terminal
101 transmitting unit
102 receiving unit
103 control unit
201 transmitting unit
202 receiving unit
203 control unit
1001 processor
1002 memory
1003 storage
1004 communication device
1005 input device
1006 output device

The invention claimed is:

1. A terminal for executing a sidelink communication that is an inter-terminal direct communication, the terminal comprising:
    a control unit that determines a size of a transport block in a physical sidelink shared channel, PSSCH, including sidelink control information, SCI, the PSSCH being to be transmitted in a same slot as a slot for a physical sidelink control channel, PSCCH; and
    a transmitting unit that transmits sidelink data to another terminal based on the size of the transport block,
    wherein the control unit determines a number of coding bits for the SCI based on a first parameter to determine the number of the coding bits for the SCI to be mapped onto the PSSCH, and wherein the first parameter is information that is independent of a second parameter to determine a number of coding bits for uplink control information, UCI.

2. The terminal according to claim 1, further comprising:
a receiving unit,
wherein the receiving unit receives a size of a first sidelink overhead from a base station through a Radio Resource Control signaling, and
wherein the control unit determines the size of the transport block based on the size of the first sidelink overhead.

3. The terminal according to claim 2, wherein the receiving unit receives, from the base station, a size of a second overhead for a communication between the terminal and the base station, and
wherein the first sidelink overhead is configuration information independent of the second overhead.

4. The terminal according to claim 2, wherein the control unit determines the size of the transport block based on a size of the PSCCH and a size of the SCI, in addition to the size of the first sidelink overhead.

5. The terminal according to claim 1, wherein the control unit determines the size of the transport block based on a number of resources for a sidelink demodulation reference, DMRS, signal, and
wherein the number of the resources for the sidelink DMRS is the number of resources for the sidelink DMRS in resources not associated with the PSCCH.

6. A communication method executed by a terminal for executing a sidelink communication that is an inter-terminal direct communication, the method comprising:
determining a size of a transport block in a physical sidelink shared channel, PSSCH, including sidelink control information, SCI, the PSSCH being to be transmitted in a same slot as a slot for a physical sidelink control channel, PSCCH; and
transmitting sidelink data to another terminal based on the size of the transport block,
wherein the determining determines a number of coding bits for the SCI based on a first parameter to determine the number of the coding bits for the SCI to be mapped onto the PSSCH, and
wherein the first parameter is information that is independent of a second parameter to determine a number of coding bits for uplink control information, UCI.

* * * * *